US006251058B1

(12) United States Patent
Ward et al.

(10) Patent No.: US 6,251,058 B1
(45) Date of Patent: *Jun. 26, 2001

(54) TREATMENT OF SOIL CONTAMINATED WITH HAZARDOUS RESIDUES

(75) Inventors: Owen P. Ward; Ajay Singh, both of Waterloo; Kate Billingsley, Ottawa, all of (CA)

(73) Assignee: Petrozyme Technologies, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,177

(22) Filed: Jan. 28, 1999

(30) Foreign Application Priority Data

Jan. 29, 1998 (CA) ................................ 2 228 098
Apr. 7, 1998 (CA) ................................ 2 234 182

(51) Int. Cl.[7] .............. A62D 3/00; B08B 7/04; B09C 1/04
(52) U.S. Cl. .......... 588/249; 134/10; 134/25.1; 134/40; 210/690; 588/205; 588/206; 588/255
(58) Field of Search ................. 588/205, 206, 588/207, 249, 252, 255; 405/128; 134/10, 25.1, 40; 210/671, 680, 690, 693

(56) References Cited

U.S. PATENT DOCUMENTS

| | | | |
|---|---|---|---|
| 3,985,689 | * 10/1976 | Ferguson | 210/690 X |
| 4,537,877 | 8/1985 | Ericsson | 502/402 |
| 4,626,356 | 12/1986 | Suzuki et al. | 210/705 |
| 4,737,394 | 4/1988 | Zafiroglu | 428/102 |
| 4,753,917 | 6/1988 | Grenthe | 502/404 |
| 4,783,263 | * 11/1988 | Trost et al. | 210/690 X |
| 4,829,045 | 5/1989 | Fransham | 502/401 |
| 4,923,125 | * 5/1990 | Bateson et al. | 588/205 X |
| 4,925,343 | * 5/1990 | Raible et al. | 405/60 X |
| 5,223,147 | 6/1993 | Rosenstock et al. | 210/705 |
| 5,242,598 | * 9/1993 | Shannon et al. | 210/690 |
| 5,252,215 | 10/1993 | McFarlane et al. | 210/69.1 |
| 5,414,201 | * 5/1995 | Greene | 588/206 |
| 5,514,218 | 5/1996 | Woodmansee et al. | 134/7 |
| 5,536,898 | * 7/1996 | Conner et al. | 588/252 |
| 5,585,319 | 12/1996 | Saitoh et al. | 502/404 |
| 5,599,137 | * 2/1997 | Stephenson et al. | 405/128 |
| 5,689,024 | 11/1997 | Schmitt | 585/467 |
| 5,911,541 | * 6/1999 | Johnson | 405/128 |

* cited by examiner

Primary Examiner—George Suchfield
(74) Attorney, Agent, or Firm—Gifford, Krass, Groh, Sprinkle, Anderson & Citkowski, P.C.

(57) ABSTRACT

A method for removal of organic contaminants from solid particulate soil contaminated with the organic contaminants. The method comprises forming an aqueous slurry of a mixture of a hydrophobic adsorbent selected from foamed synthetic materials or natural materials which entrap gas, with the soil in the presence of water. The adsorbent has a density less than water. The slurry is mixed for a period of time, and a gravity separation of the adsorbent from the aqueous admixture thus obtained is effected.

21 Claims, No Drawings

TREATMENT OF SOIL CONTAMINATED WITH HAZARDOUS RESIDUES

FIELD OF THE INVENTION

The present invention relates to a method for the treatment of soil materials contaminated with hazardous hydrophobic organic substances or residues, and in particular to a method for removal of such hazardous hydrophobic organic substances in which the soil material is substantially comprised of clay and/or sand. Hazardous organic substances or residues are referred to herein as "organic contaminants". As noted herein, organic contaminants may include hydrocarbon materials e.g. oil, provided such materials are present in a minor amount.

Reference is made herein to the use of adsorbent materials. However, it is to be understood that those materials might also exhibit absorbent properties with respect to the organic contaminants or combinations of the contaminants with oil or other mobilizing agents. In addition, as used herein, soil includes clays and sands.

BACKGROUND OF THE INVENTION

Owners of sites containing soils contaminated with hazardous substances may be required by governmental or other regulations to remediate these materials. Examples of known methods of doing so include application of biological, physical or chemical methods to remove or stabilize/destroy the substances, or to transfer the contaminated material to approved off-site landfills. The methods used to remediate solid materials include bioremediation, aqueous soil washing including use of surfactants, soil extraction with organic solvents, thermal desorption and incineration. Although such methods may be effective, they also tend to be expensive.

There is substantial interest in development of cost effective methods for removing or remediating organic contaminants from solid particulate materials such as soil. Because of the low solubility of these organic contaminants in water, such contaminants tend to tightly adsorb on or absorb into the solid materials and consequently are less amenable to biodegradation by microorganisms, which normally requires an aqueous phase for growth and metabolism.

It has been observed that the degree of difficulty of extracting or remediating organic contaminants from soil increases with an increased content of clay and/or humic substances or organic carbon in the soil.

More economic methods for removal of hazardous contaminants from soils are required for purposes of remediating the soil and to prevent contaminants from spreading through the soil and/or to prevent contamination of groundwater.

SUMMARY OF THE INVENTION

A method for remediating soils containing hazardous organic contaminants has now been found.

Accordingly, one aspect of the present invention provides a method for remediating soil containing organic contaminants, comprising:

a) forming an aqueous slurry of a mixture of a hydrophobic adsorbent selected from foamed synthetic materials with said soil in the presence of water, the adsorbent having a density less than water;

b) mixing said slurry for a period of time; and c) effecting a gravity separation of the adsorbent from the aqueous admixture thus obtained.

In another aspect, the present invention provides a method for removal of organic contaminants from solid particulate soil contaminated with the organic contaminant, comprising:

a) forming an aqueous slurry of a mixture of a hydrophobic adsorbent selected from natural materials which entrap gas, and cellular or foamed materials prepared by synthesis or modification of natural fibres with said soil in the presence of water, the adsorbent having a density less than water;

b) mixing said slurry for a period of time; and c) effecting a gravity separation of the adsorbent and sorbed organic contaminant from the aqueous admixture thus obtained.

In a preferred embodiment, the adsorbent is a natural material with entrapped gas-containing pores.

In preferred embodiments of the methods of the present invention, the slurry is subjected to a step to permit settling of soil and other particulate prior to effecting separation of the adsorbent.

In further embodiments, the admixing of the slurry effects contact between the adsorbent and the soil.

In a further embodiment, a mobilizing agent may be added to the aqueous slurry to promote better mobilization of the contaminant from the soil particles to the adsorbent and/or for better sorption.

In a still further embodiment, the hydrophobic adsorbent may be added and mixed with the soil prior to addition of water to form an aqueous slurry.

In another embodiment, a surfactant is added to the slurry to effect separation of the organic contaminant from the soil, said surfactant being selected in an amount that does not inhibit adsorption of the organic contaminant on the adsorbent.

In yet another embodiment, the water content of the aqueous slurry is at least 25% by weight of the soil, especially 25–100% by weight.

In a further embodiment, the soil is comprised of clay and/or sand.

DETAILED DESCRIPTION OF THE INVENTION

The method of the invention involves mixing the soil, water, with or without any other agents e.g. oil material, and the adsorbent, thereby forming a slurry. These components may be added and mixed with the soil in a single operation or by adding and mixing individual components in any sequence. Mixing may be accomplished using processes known in the art, including using reactors, tanks with air spargers, impellers, rakes, screw assemblies or stirrers, rotating drums e.g. similar to a cement mixer, tumblers, reactors on reciprocating or orbital shaking machines, vibration or sonication mixers and screw or other conveyor equipment.

The slurry is preferably directed to a settling step, which may be accomplished in the mixing vessel or a following conveyance, including by pouring or other transfer of the slurry to a separating vessel. The separating vessel may or may not contain additional water to promote separation of soil and adsorbent. The mixing and/or separation stages may be carried out in a batch or continuous mode.

The separated floating organic contaminant/adsorbent material is recovered and may be further processed by a variety of methods e.g. compression, heating or washing. The adsorbent binding the organic contaminant may be volume reduced by thermal or solvent treatment or by using other physical or chemical methods which melt the polymer and destroy the cellular structure or depolymerize or otherwise modify the polymer, or the adsorbed organic contaminant or the mixture.

In the method of the present invention, an aqueous slurry is formed from a mixture of a hydrophobic adsorbent and soil. The soil may be obtained from a wide variety of sources, and is soil that has been contaminated with an organic contaminant. The soil is a solid particulate, which may be in a variety of forms.

Hazardous organic contaminants that may be treated by the method of the invention include aliphatic, aromatic, polycyclic aromatic, heterocyclic and other cyclic compounds, and derivatives of such compounds, especially derivatives containing halogen, nitrogen, sulphur and/or oxygen atoms. Examples of toxic compounds include polycyclic aromatic hydrocarbons (PAHs); polychlorinated biphenyls (PCBs); phthalate esters; phenols and chlorinated phenols; pesticides and herbicides and related structures; chlorinated ethanes, ethylenes and methane; monoaromatics including BTEX compounds; dioxins and furans; nitrotoluenes and nitrobenzenes. BTEX is a mixture of benzene, toluene, ethyl benzene and xylene. The method of the invention may also be used to treat other known hazardous organic contaminants, unidentified toxic substances and mixtures of toxic organic components.

A variety of adsorbent materials may be used, which as discussed above may also exhibit absorbent properties towards the organic contaminants. Examples of adsorbents are given below. The preferred adsorbents are hydrophobic and float in water e.g. have a density of less than one, and are particularly effective in promoting flotation of the hydrophobic adsorbent with associated organic contaminant.

The adsorbent materials are foamed synthetic materials, especially polymeric foams or cellular polymers, which contain a large number of pockets or pores which entrap gas and substantially decrease the apparent density of the material. When the cells or pores are interconnected, the material is described as open-celled, whereas when cells are discreet, they are termed closed celled. The foamed synthetic materials, which may be rigid or flexible, are produced by production methods including methods including extrusion, expansion, froth foaming, compression and injection moulding and sintering.

Examples of foamed synthetic materials are foams of synthetic materials of polystyrene, polyvinylchloride, polyethylene, polyurethane, epoxy and phenolic and urea-formaldehyde resins, silicones, cellulose acetate, polytetrafluoroethylene, ebonite, natural and foam rubber. Other foamed polymers include novel biodegradable foam materials incorporating modified polysaccharides, including starches. The foamed synthetic materials, may be mixtures of polymers or copolymers. For example, the susceptibility of polystyrene foams to attack by some petroleum solvents led to the development of styrene-acrylonitrile copolymers which are resistant to these materials.

The foamed synthetic materials may be in a variety of shapes and sizes including sheets, discs, spheres, other shapes, extruded cylindrical fibres (spaghetti), as well as in other various forms including irregular shapes produced by disintegration of larger moulded materials. Key properties for the invention are the hydrophobic properties of the foam surfaces promoting selective sorption of hydrophobic oil components and their low apparent densities which when coupled with moisture resistance provides high buoyancy or flotation characteristics. This facilitates separation of the particles containing sorbed organic contaminants from the heavier solids and aqueous liquid phases. Closed-cell structures tend to maximize flotation characteristics.

Foams can also be classified as rigid or flexible. In general, more rigid foams are preferred for flotation applications.

Example of ranges of densities of some rigid foam plastics are polystyrene, 32–160 kg/m$^3$; polyvinyl chloride, 32–64 kg/m$^3$; polyurethanes 32–128 kg/m$^3$; cellulose acetate 96–128 kg/m$^3$ phenolic forms, 32–64 kg/m$^3$. Polystyrene foams produced by the decompression expansion process have a density in the range of 23–53 kg/m$^3$.

In addition, adsorbents that may be used in the method of the invention include natural materials having pockets which entrap gas, for example, particles of lignocellulose, cellulose or other plant materials which contain gas filled pores. In addition, cellular or foamed materials prepared by synthesis or modification of natural fibres or polymers including cellulose, lignocellulose, starches, proteins and lipids, combinations of these and mixtures of natural polymers and synthetic chemicals or copolymers may be used.

The choice of preferred adsorbents will be determined by a variety of considerations, including flotation and sorption properties. Highest flotation efficiency is observed with adsorbents having limited or no external pores, e.g. expanded polystyrene beads with a surface "skin". Maximum sorption is observed with cellular adsorbents which have an external open pore structure. Materials which have external pores allowing effective binding of contaminant and/or penetration into the adsorbent but which retain some gas filled cells will promote high efficiencies of both sorption and contaminant separation by flotation.

The adsorbent is not, however, limited to foamed materials and may involve use of non-foamed adsorbent particles which have a density of less than one. The adsorbent may also be polymeric particles, both hydrophobic and non-hydrophobic, which may be coated with a hydrophobic surface layer.

The aqueous slurry used in the method of the present invention preferably contains at least 25% by weight of water, based on the weight of soil material, and especially 25–100% by weight of water. Higher amounts of water may be used, but such higher amounts tends to lead to additional costs in the forming of the slurry. In the subsequent separation of the adsorbent from the aqueous mixture, the amount of water should be sufficient to effect efficient floating of sorbent/contaminant above the soil in the mixture. Thus, higher amounts of water may be preferred e.g. at least 100% by weight of water based on the weight of the soil material, and especially 100–200% by weight, although higher amounts may be used.

The time period for mixing of the aqueous slurry of adsorbent and soil may be varied, depending on the mixing method.

Effective separation may normally be achieved by gravity separation (flotation), but supplementary methods may be used to improve the rate of separation, reduce water content and/or reduce residual water content in the soil.

Transfer of the organic contaminant from the sand or soil particles to the added polymers in an aqueous medium may be accelerated or facilitated by addition of a mobilizing agent of a suitable oil or other solvent or chemical capable of extracting or solubilizing the organic contaminant. An amount of less than 20% by weight of the soil is preferred. Such addition may be before or after the aqueous slurry is formed. The type and concentration of any solvent or chemical used should promote contaminant mobilization from the sand or soil particles but not inhibit adsorption of the contaminant to the polymer. The mobilizing agent may consist of natural oils from animal, microbial or vegetable oil sources, hydrocarbon oils or other organic solvents which can assist in transfer of the contaminant to the adsorbent. Up to 25% by weight, especially up to 15% by weight, of organic solvent may be added as part of the mobilizing agent.

In a preferred embodiment, the mobilizing agent added is a contaminant-solubilizing solvent or chemical, or an animal or vegetable oil, or any combination thereof, which is added to promote better contaminant mobilization from the soil.

The method of the present invention may be operated as a continuous process or as a batch process.

The method may involve a single extraction process or a multiple extraction process where, following removal of the separated organic contaminant-sorbent material, the soil is again treated with additional adsorbent. The method of the invention may also be used as part of a soil treatment train, where other physical, chemical or biological methods are used as a pre-intermediate or post-treatment to remove a portion of the organic contaminant.

While the present application refers to the presence of oil in the soil that is treated, it is understood that the amount of any hydrocarbon contaminant e.g. oil is intended to be a minor amount. In the event that the hydrocarbon contaminant is not a minor amount, the method of treatment is covered by a separate patent application of Owen Ward and Ajay Singh (Ser. No. 09/239,479, filed Jan. 28, 1999 and now U.S. Pat. No. 6,153,017) filed concurrently herewith.

The present invention is illustrated by the following examples.

EXAMPLE I

In this example, different kinds of foamed polystyrene adsorbents were used, optionally in the presence of peanut oil as a mobilizing agent, for the removal of polyaromatic hydrocarbons (PAHs) from contaminated soil. Garden soil, contaminated with different polyaromatic hydrocarbons (about 2000 ppm of total PAHs), was used in the form of a 50% (w/v) slurry.

The following adsorbents were tested:
Sorbent A. Foamed polystyrene (broken packing, skinless, 4–6 mm)
Sorbent B. Foamed polystyrene (broken packing, porous, 4–6 mm)
Sorbent C. Polystyrene beads (with skin, 4 mm)
Sorbent D. Polystyrene beads (with skin, 1.5 mm)

To 10 g contaminated soil were added 10 ml water, 0.25% (w/v) of adsorbent and 0.5% (v/v) of peanut oil and the resultant mixture was put on a rotary shaker at 200 rpm for 24 hr. An additional 10 ml water was added and the adsorbent was separated after settling of soil for 10 min.

Residual polyaromatic hydrocarbons in the soil were measured using gas chromatography with a flame ionization detector (GC-FID) (Shimadzu, Japan).

The residual PAHs in soil was determined by extracting with 10 ml dichloromethane and centrifuging at 4,000 rpm for 5 min. The dichloromethane extract was passed through a column containing florisil and sodium sulphate to remove any residual oil and water. A one microliter sample was injected into the GC-FID system to measure the concentration of individual PAHs.

The results obtained are given in Table 1.

TABLE 1

Percentage removal of PAHs from soil

| Adsorbent type | Peanut Oil | Naphthalene | Anthracene | Fluoranthene | Pyrene | Benzopyrene | Total |
|---|---|---|---|---|---|---|---|
| A | no | 71 | 32 | 49 | 48 | 55 | 51 |
|   | yes | 88 | 85 | 89 | 88 | 81 | 86 |
| B | no | 80 | 26 | 42 | 42 | 51 | 48 |
|   | yes | 88 | 87 | 92 | 92 | 92 | 90 |
| C | no | 71 | 19 | 36 | 36 | 46 | 42 |
|   | yes | 83 | 88 | 91 | 91 | 91 | 89 |
| D | no | 58 | 11 | 32 | 31 | 51 | 37 |
|   | yes | 85 | 88 | 90 | 89 | 90 | 88 |

The results indicate that up to 90% of PAHs can be extracted out of contaminated soil using a single extraction, particularly when the polystyrene adsorbents were used in the presence of the mobilizing agent. Different adsorbent types performed similarly.

EXAMPLE II

Foamed polystyrene adsorbent A of Example I was used in the presence of different concentrations of the mobilizing agent (peanut oil) for the removal of polyaromatic hydrocarbons (PAHs) from the contaminated soil described in Example I. To 10 g contaminated soil (about 2000 ppm of total PAHs) were added 10 ml water, 0.25% (w/v) of adsorbent and different concentrations of peanut oil and the resultant mixture was put on a rotary shaker at 200 rpm for 24 hr. An additional 10 ml water was added and the adsorbent was separated after settling of soil for 10 min.

Residual polyaromatic hydrocarbons in the soil were measured using the procedure of Example I and the results are shown in Table 2.

TABLE 2

Percentage removal of PAHs from soil using the process

| Peanut Oil (%) | Napthalene | Anthracene | Fluoranthene | Pyrene | Benzopyrene | Total |
|---|---|---|---|---|---|---|
| 0 | 71 | 32 | 49 | 48 | 55 | 51 |
| 0.5 | 90 | 84 | 90 | 88 | 74 | 85 |
| 1.0 | 93 | 76 | 93 | 91 | 86 | 88 |

The results indicate that PAHs were removed efficiently at vegetable (peanut) oil concentrations of 0.5–1.0% by weight. While 71% of the naphthalene was removed by the sorbent in the absence of mobilizing agent, removal of other PAHs was less efficient under these conditions.

EXAMPLE III

Foamed polystyrene adsorbent A was used in the presence of different concentrations of peanut oil for the removal of polyaromatic hydrocarbons (PAHs) from weathered soil. To 10 g contaminated soil (~1600 ppm of total PAHs), 10 ml water, 0.25% (w/v) of adsorbent and different concentration of peanut oil were added and put on a rotary shaker at 200 rpm for 24 hr. An additional 10 ml water were added and the adsorbent was separated after settling of soil for 10 min.

Residual polyaromatic hydrocarbons in the soil were measured using gas chromatography with a flame ionization detector (GC-FID) by Biorem Technologies Inc., Guelph, Ontario.

Results are shown in Table 3.

TABLE 3

| Components | Peanut Oil 0.5% | Peanut oil 1.0% |
|---|---|---|
| Acenaphthylene | 40 | 61 |
| Acenaphthene | 41 | 97 |
| Fluorene | 55 | 70 |
| Phenanthrene | 23 | 37 |
| Anthracene | 59 | 62 |
| Fluoranthene | 29 | 29 |
| Pyrene | 51 | 90 |
| Benzo(a)anthracene | 71 | 74 |
| Chrysene | 81 | 76 |
| Benzo(k)fluroanthene | 74 | 82 |
| Benzo(a)pyrene | 70 | 83 |
| Indeno & Dibenzo | 62 | 95 |
| Benzo(ghi)perylene | 93 | 85 |
| Total PAHs | 58 | 73 |

About 58% and 73% total PAHs were removed in the sorbent system containing the mobilizing agent peanut oil at 0.5% and 1% concentrations, respectively. Removal efficiencies of different PAHs ranged from 29% to 97% with 1% peanut oil.

EXAMPLE IV

In this example, the effect of mobilizing agents (i) peanut oil, (ii) a non-ionic surfactant Igepal CO-630 and (iii) a combination of peanut oil and surfactant, were tested using adsorbent A of Example I for the removal of the volatile organic compounds, benzene, toluene, ethyl benzene and xylenes (BTEX) from contaminated soil.

To 10 g contaminated soil (about 1000 ppm of total BTEXs) were added 10 ml water, 0.25% (w/v) of adsorbent and different concentrations of the mobilizing agent and the resultant mixtures were put on a rotary shaker at 200 rpm for 4 hr. An additional 10 ml water was added and the adsorbent was separated after settling of soil for 10 min.

Residual BTEX compounds in the soil were measured using gas chromatography with a flame ionization detector (GC-FID), using the procedure of Example I.

TABLE 4

Percentage removal of BTEX compounds from soil by the sorbent

| Mobilizing agent | Benzene | Toluene | Ethyl benzene | m/p-Xylene | o-Xylene | Total |
|---|---|---|---|---|---|---|
| None | 49 | 63 | 76 | 76 | 75 | 68 |
| 0.05% Peanut oil | 47 | 58 | 71 | 71 | 71 | 64 |
| 0.2% Peanut oil | 55 | 67 | 79 | 79 | 79 | 72 |
| 0.5% Peanut oil | 73 | 80 | 88 | 88 | 88 | 84 |
| 0.05% Igepal | 55 | 62 | 73 | 73 | 71 | 67 |

TABLE 4-continued

Percentage removal of BTEX compounds from soil by the sorbent

| Mobilizing agent | Benzene | Toluene | Ethyl benzene | m/p-Xylene | o-Xylene | Total |
|---|---|---|---|---|---|---|
| 0.1% Igepal | 50 | 53 | 62 | 62 | 61 | 58 |
| 0.2% Igepal | 54 | 44 | 46 | 45 | 44 | 47 |
| 0.1% Peanut oil + 0.1% Igepal | 42 | 29 | 26 | 27 | 28 | 30 |

The maximum BTEX removal (84%) was observed with 0.5% peanut oil. Increasing concentrations of surfactant resulted in a decreased percentage removal of the BTEX. A combination of peanut oil and surfactant was ineffective.

EXAMPLE V

In this example, the effect of mobilizing agents (i) peanut oil, and (ii) a non-ionic surfactant Igepal™ CO-630, were tested using sorbent E (foamed polyolefin, skinless, 4 mm) for the removal of trichloroethylene (TCE) from contaminated soil.

To 10 g contaminated soil (containing up to 100 ppm trichloroethylene) were added 10 ml water, 0.25% (w/v) of adsorbent and different concentrations of peanut oil or surfactant Igepal CO-630 and the resultant mixture was put on a rotary shaker at 200 rpm for 4 hr. An additional 10 ml water was added and the polyolefin adsorbent/oil was separated after settling of soil for 10 min.

Residual TCE in soil was measured using gas chromatography with a flame ionization detector (GC-FID), using the procedure of Example I, and results are shown in Table 5.

TABLE 5

Percentage removal of TCE from soil

| Mobilizing agent (%) | TCE conc. (ppm) | TCE removal (%) |
|---|---|---|
| None | 100 | 58 |
| None | 40 | 70 |
| None | 20 | 65 |
| None | 10 | 53 |
| 0.1% Peanut oil | 100 | 35 |
| 0.2% Peanut oil | 100 | 37 |
| 0.2% Peanut oil | 20 | 71 |
| 0.05% Igepal CO-630 | 20 | 72 |
| 0.05% Igepal CO-630 | 100 | 40 |
| 0.1% Igepal CO-630 | 100 | 33 |

At different concentrations of TCE, up to 70% removal of TCE from contaminated soil was obtained by the sorbent in the absence of any mobilizing agent. No significant effect of mobilizing agent on TCE removal was observed.

EXAMPLE VI

In this example, the effect of mobilizing agents peanut oil, a non-ionic surfactant Igepal CO-630 and a short chain fatty acid tributyrin were tested with polystyrene adsorbent A for the removal of pentachlorophenol (PCP) from contaminated soil.

To 10 g contaminated soil (250 ppm PCP), 10 ml water, 0.25% (w/v) of adsorbent and different concentrations of mobilizing agents were added and put on a rotary shaker at 200 rpm for 24 hr. An additional 10 ml water was added and the adsorbent/oil was separated after settling of soil for 10 min.

Residual PCP in the soil were measured using gas chromatography with a flame ionization detector (GC-FID) after extraction of DCM:acetone (1:1) and results are shown in Table 6.

TABLE 6

Percentage removal of PCP from soil

| Sorbent type | Mobilizing agent (%) | PCP removal |
|---|---|---|
| A | None | 35 |
| A | 0.2% Peanut oil | 41 |
| A | 0.5% Peanut oil | 77 |
| A | 0.05% Igepal | 62 |
| A | 0.2% Igepal | 67 |
| A | 0.5% Igepal | 19 |
| E | 0.5% Tributyrin | 78 |

Maximum removal of 77% and 78% PCP was achieved with mobilizing agents peanut oil and tributyrin, respectively.

EXAMPLE VII

In this example, the effect of mobilizing agents peanut oil, a non-ionic surfactant Igepal CO-630 and a combination of peanut oil and surfactant were tested with polystyrene adsorbent A for the removal of dioctyl phthalate (DOP) from contaminated soil.

To 10 g contaminated soil (up to 5000 ppm DOP), 10 ml water, 0.25% (w/v) of adsorbent and different concentrations of peanut oil or surfactant Igepal CO-630 were added and put on a rotary shaker for 200 rpm for 24 h. An additional 10 ml water was added and the adsorbent/oil was separated after settling of soil for 10 min.

Residual DOP in soil were measured using gas chromatography with a flame ionization detector (GC-FID) and results are shown in Table 7.

TABLE 7

Percentage removal of DOP from soil

| DOP conc. (ppm) | Mobilizing agent (%) | DOP removal (%) |
|---|---|---|
| 2000 | None | 67 |
| 2000 | 1% Peanut oil | 77 |
| 2000 | 0.1% Igepal | 74 |
| 5000 | None | 17 |
| 5000 | 0.5% Peanut oil | 50 |
| 5000 | 1.0% Peanut oil | 63 |
| 5000 | 0.1% Igepal | 41 |
| 5000 | 0.5% oil + 0.05% Igepal | 39 |

Maximum DOP removal by sorbent obtained with vegetable oil and surfactant was 77% and 74%, respectively. A combination of peanut oil and surfactant was ineffective.

EXAMPLE VIII

The efficiency of removal of polychlorinated biphenyls (PCBs) from contaminated soil by the mobilizing agent (i) vegetable (canola) oil and (ii) mineral oil, was tested.

Foamed polystyrene (broken packing, skinless, 2–4 mm) was used as adsorbent. The effect of mixtures of 90% mobilizing agent with 10% acetone (w/w) was also tested.

To 475 g contaminated soil containing 250–440 ppm of Aroclor 1260, 18% mobilizing agent (w/v) was added; Aroclor 1260 is a mixture of PCB's with 60% chlorine content, obtained from Monsanto. After mixing for 1 h, the admixture was left stationary for 24 h. 200 ml water and 0.5% (w/w soil) of adsorbent were added and mixed for 1 h. Separation and removal of the adsorbent was facilitated by the addition of 50 ml of water. Another 0.5% (w/w soil) of adsorbent was added, mixed for 1 h, and removed after separation.

Residual PCBs in the soil were measured using gas chromatography. Results are shown in Table 8.

TABLE 8

| Mobilizing agent | % Removal of PCBs from soil |
|---|---|
| Canola oil | 75 |
| 90% Canola oil/10% acetone | 85 |
| Mineral oil | 78 |
| 90% Mineral oil/10% acetone | 93 |

The mobilizing agent containing mineral oil proved to be the more effective. The presence of acetone in the mobilizing agent increased the efficiency of PCB removal from the soil.

EXAMPLE IX

The most efficient mobilizing agent was selected from Example VII and used in a scaled-up test to monitor the removal PCBs from contaminated soil using industrial mixing equipment.

20 kg of soil contaminated with 250–440 ppm of Aroclor™ 1260 was mixed at 75 rpm for 1 h with 20% mobilizing agent (w/w) made up of 90% mineral oil with 10% acetone (w/w) in a 6 ft³ mortar mixer. The mixture was left stationary for 24 h. 5 kg of water and 0.5% (w/w soil) broken foamed polystyrene were added and mixed for 1 h. Another 5 kg of water was added to effect separation of the polystyrene.

Analysis of the treated soil showed 90% removal of the PCBs.

What is claimed is:

1. A method for remediating soil containing organic contaminants, comprising:
   a) forming an aqueous slurry of a mixture of a hydrophobic adsorbent selected from foamed synthetic materials with said soil in the presence of water and a mobilizing agent, said mobilizing agent being an oil, the adsorbent having a density less than water;
   b) mixing said slurry for a period of time; and
   c) effecting a gravity separation of the adsorbent from the aqueous admixture thus obtained.

2. The method of claim 1 in which the admixing of the slurry effects contact between the adsorbent and the soil.

3. The method of claim 2 in which the mobilizing agent is added at a concentration of less than 20% by weight of soil, to promote better mobilization of the organic contaminant from the soil particles to the adsorbent and/or for better sorption.

4. The method of claim 3 in which the mobilizing agent is added to the soil prior to the formation of the slurry.

5. The method of claim 3 in which the mobilizing agent is mixed with the soil for a period of time to promote better mobilization of the organic contaminant from the soil particles, prior to the addition of water and adsorbent to effect the gravity separation step.

6. The method of claim 1 in which the water content of the aqueous slurry is at least 25% by weight of the soil.

7. The method of claim 6 in which the water content is 25–100% by weight.

8. The method of claim 1 in which the foamed adsorbent is a polymer or copolymer of styrene.

9. A method for removal of organic contaminants from solid particulate soil contaminated with the organic contaminant, comprising:
   a) forming an aqueous slurry of a mixture of a hydrophobic adsorbent selected from natural materials which entrap gas, and cellular or foamed materials prepared by synthesis or modification of natural fibres with said soil in the presence of water and a mobilizing agent, said mobilizing agent being an oil, the adsorbent having a density less than water;
   b) mixing said slurry for a period of time; and
   c) effecting a gravity separation of the adsorbent and sorbed organic contaminant from the aqueous admixture thus obtained.

10. The method of claim 9 in which the adsorbent is a natural material with entrapped gas-containing pores.

11. The method of claim 9 in which the adsorbent is a foamed material prepared from natural polymers or fibres with or without synthetic copolymers.

12. The method of claim 9 in which the slurry is subjected to a step to permit settling of soil and other particulate prior to effecting separation of the adsorbent.

13. The method of claim 8 in which the mobilizing agent is added at a concentration of less than 20% by weight of soil.

14. The method of claim 1 in which a partial removal of organic contaminant from the soil is effected.

15. The method of claim 1 in which the foamed absorbent is mixed with the soil in the absence of water, with water being added to effect gravity separation.

16. The method of claim 1 in which the organic contaminant is selected from the group comprising aliphatic, aromatic, polycyclic, aromatic, heterocyclic and other cyclic compounds, and derivatives thereof.

17. The method of claim 16 in which the derivatives contain at least one of halogen, nitrogen, sulphur and oxygen atoms.

18. The method of claim 16 in which the organic contaminant is at least one of polycyclic aromatic hydrocarbons; polychlorinated biphenyls; phthalate esters; phenols and chlorinated phenols; pesticides and herbicides; chlorinated ethanes, ethylenes and methane; monoaromatic compounds; dioxins and furans; nitrotoluenes and nitrobenzenes.

19. The method of claim 13 in which the mobilizing agent contains up to 25% by weight of organic solvent.

20. The method of claim 1 in which the oil is selected from the group consisting of vegetable, animal and mineral oil.

21. The method of claim 9 in which the oil is selected from the group consisting of vegetable, animal and mineral oil.

* * * * *